(12) United States Patent  (10) Patent No.: US 8,907,607 B1
Ma  (45) Date of Patent: Dec. 9, 2014

(54) SOFT START CIRCUIT FOR A FORWARD/REVERSE ROTATION FAN

(71) Applicant: ADDA Corp., Pingtung, Pingtung County (TW)

(72) Inventor: Ching-Cheng Ma, Pingtung County (TW)

(73) Assignee: ADDA Corp., Pingtung, Pingtung County (TW)

( * ) Notice: Subject to any disclaimer, the term of this patent is extended or adjusted under 35 U.S.C. 154(b) by 16 days.

(21) Appl. No.: 13/953,848

(22) Filed: Jul. 30, 2013

(51) Int. Cl.
H02P 1/16 (2006.01)
F04D 25/08 (2006.01)

(52) U.S. Cl.
USPC . 318/431; 318/430; 318/400.11; 318/400.13; 361/23; 417/423.7

(58) Field of Classification Search
USPC .......... 318/431, 430, 400.11, 400.13, 400.14; 361/23; 417/423.7
See application file for complete search history.

(56) References Cited

U.S. PATENT DOCUMENTS

| | | | | |
|---|---|---|---|---|
| 4,412,158 A * | 10/1983 | Jefferson et al. | ............... | 318/257 |
| 4,611,154 A * | 9/1986 | Lambropoulos et al. | ..... | 318/490 |
| 4,763,347 A * | 8/1988 | Erdman | .................... | 318/400.22 |
| 5,612,599 A * | 3/1997 | Itami et al. | ............... | 318/400.27 |
| 6,295,510 B1 * | 9/2001 | Discenzo | ...................... | 702/183 |
| 6,434,512 B1 * | 8/2002 | Discenzo | ...................... | 702/184 |
| 6,545,442 B2 * | 4/2003 | Sunaga et al. | ................. | 318/727 |
| 6,819,069 B2 * | 11/2004 | Hornberger et al. | ..... | 318/400.12 |
| 6,825,625 B1 * | 11/2004 | Karwath et al. | ............... | 318/434 |
| 6,850,426 B2 * | 2/2005 | Kojori et al. | ................... | 363/123 |
| 7,038,412 B2 * | 5/2006 | Karwath et al. | ......... | 318/400.22 |
| 7,315,095 B2 * | 1/2008 | Kagemoto et al. | ............... | 307/39 |
| 7,433,164 B2 * | 10/2008 | Chu | ................................ | 361/23 |
| 7,515,393 B2 * | 4/2009 | Bliley et al. | ..................... | 361/92 |
| 7,781,998 B2 * | 8/2010 | Liu et al. | .................. | 318/400.26 |
| 7,786,688 B2 * | 8/2010 | Hayashi et al. | .......... | 318/400.29 |
| 7,800,328 B2 * | 9/2010 | Hayashi | ....................... | 318/430 |
| 7,847,498 B2 * | 12/2010 | Shibuya | ................... | 318/400.01 |
| 7,915,843 B2 * | 3/2011 | Mishima et al. | ......... | 318/400.13 |
| 8,084,973 B2 * | 12/2011 | Hayashi | ................... | 318/400.22 |
| 8,093,846 B2 * | 1/2012 | Mishima et al. | ......... | 318/400.13 |
| 8,198,843 B2 * | 6/2012 | Kitagawa | ................. | 318/400.06 |
| 8,384,324 B2 * | 2/2013 | Nakahata et al. | ......... | 318/400.04 |
| 8,421,390 B2 * | 4/2013 | He | ................................ | 318/430 |
| 8,593,100 B2 * | 11/2013 | Nakahata et al. | .............. | 318/599 |
| 8,618,763 B2 * | 12/2013 | Noie et al. | ...................... | 318/599 |
| 8,653,774 B2 * | 2/2014 | Shimizu et al. | .......... | 318/400.38 |
| 8,729,841 B2 * | 5/2014 | Reynolds et al. | ........ | 318/400.14 |
| 8,796,975 B2 * | 8/2014 | Lee et al. | ....................... | 318/431 |
| 2002/0030463 A1 * | 3/2002 | Sunaga et al. | ................. | 318/727 |

(Continued)

*Primary Examiner* — Paul Ip
(74) *Attorney, Agent, or Firm* — Jackson IPG PLLC

(57) ABSTRACT

A soft start circuit for a forward/reverse rotation fan includes a forward/reverse switch unit, a soft start activation unit, a soft start control unit, a Hall IC and a driver IC, wherein the soft start activation unit comprises a first signal transmission loop and a second signal transmission loop. The soft start circuit activates the soft start control unit via a first instantaneous signal outputted by the first signal transmission loop or a second instantaneous signal outputted by the second signal transmission loop to make the soft start control unit output a control signal to a speed control terminal. When the rotating direction of fan is switched from one direction into another, the fan starts rotation in a soft start mode owing to high level of the control signal transmitted from the soft start control unit to the speed control terminal during initial rotation of the fan.

14 Claims, 3 Drawing Sheets

(56) References Cited

U.S. PATENT DOCUMENTS

| | | |
|---|---|---|
| 2005/0035733 A1* | 2/2005 | Karwath et al. .............. 318/434 |
| 2007/0114959 A1* | 5/2007 | Echazarreta ................. 318/268 |
| 2007/0258805 A1* | 11/2007 | Liu et al. ..................... 415/47 |
| 2008/0043384 A1* | 2/2008 | Chu .............................. 361/23 |
| 2008/0048598 A1* | 2/2008 | Shibuya .................... 318/400.1 |
| 2008/0272724 A1* | 11/2008 | Hayashi ....................... 318/430 |
| 2009/0045762 A1* | 2/2009 | Hayashi et al. .............. 318/379 |
| 2009/0066280 A1* | 3/2009 | Hayashi ....................... 318/430 |
| 2009/0128065 A1* | 5/2009 | Hsu et al. ..................... 318/163 |
| 2009/0153084 A1* | 6/2009 | Mishima et al. .......... 318/400.13 |
| 2009/0309535 A1* | 12/2009 | Kitagawa ..................... 318/722 |
| 2010/0181951 A1* | 7/2010 | Noie et al. ................ 318/400.11 |
| 2011/0139412 A1* | 6/2011 | Mishima et al. .............. 165/121 |
| 2011/0181214 A1* | 7/2011 | Nakahata et al. ........ 318/400.04 |
| 2011/0260669 A1* | 10/2011 | Nakahata et al. ............. 318/503 |
| 2012/0274252 A1* | 11/2012 | He ................................ 318/430 |
| 2013/0009578 A1* | 1/2013 | Reynolds et al. ......... 318/400.14 |
| 2013/0014967 A1* | 1/2013 | Ito et al. ......................... 173/93 |
| 2013/0069576 A1* | 3/2013 | Lee et al. ...................... 318/431 |
| 2014/0176030 A1* | 6/2014 | Yamato et al. ........... 318/400.11 |

* cited by examiner

SOFT START CIRCUIT FOR A FORWARD/REVERSE ROTATION FAN

FIELD OF THE INVENTION

The present invention is generally related to a soft start circuit for a forward/reverse rotation fan. Particularly, the soft start circuit makes the fan start rotation in a soft start mode when the rotation direction of the fan is switched from one into another.

BACKGROUND OF THE INVENTION

A conventional start circuit 200 for a forward/reverse rotating fan is illustrated in FIG. 3. The start circuit 200 drives a stator coil 300 of a motor to make the rotation direction of the fan switched from one direction into another. The start circuit 200 comprises a Hall IC 210, a driver IC 220 electrically connected to the Hall IC 210 and an activation unit 230 connected to the Hall IC 210, wherein the activation unit 230 comprises a first activation circuit 231 and a second activation circuit 232. The first activation circuit 231 and the second activation circuit 232 are driven simultaneously so as to change the polarity of the signal received by the Hall IC 210. Meantime, the stator coil 300 is driven by the driver IC 220 to switch the rotation direction of the fan. However, when the rotation direction of the fan is changed, the stator coil 300 likely generates spike phenomenon to influence the life time of the motor and damage the driver IC 220 and relative devices.

SUMMARY

The primary object of the present invention is to provide a soft start circuit for a forward/reverse rotation fan including a forward/reverse switch unit, a soft start activation unit, a soft start control unit, a Hall IC and a driver IC. The forward/reverse switch unit enables to receive a high level signal or a low level signal. The soft start activation unit comprises a first signal transmission loop and a second signal transmission loop, when the soft start activation unit receives the high level signal, the first signal transmission loop outputs a first instantaneous signal; oppositely, when the soft start activation unit receives the low level signal, the second signal transmission loop outputs a second instantaneous signal. When the soft start control unit receives the first instantaneous signal or the second instantaneous signal, the soft start control unit outputs a control signal to a speed control terminal of the driver IC. When the forward/reverse switch unit receives the high level signal, the Hall IC drives the driver IC via the forward/reverse switch unit to make the fan rotate in a second direction; oppositely, when the forward/reverse switch unit receives the low level signal, the Hall IC drives the driver IC via the forward/reverse switch unit to make the fan rotate in a first direction. The soft start circuit of the present invention activates the soft start control unit via the first instantaneous signal or the second instantaneous signal to make the control signal varied from low level to high level. When the rotation direction of the fan is switched from the first direction to the second direction or switched from the second direction to the first direction, the fan enables to start rotation in a soft start mode owing to high level of the control signal transmitted from the soft start control unit to the speed control terminal during initial rotation of the fan. Thereafter, the voltage level of the speed control terminal decreases gradually resulting in gradual increase of rotation speed of the fan. Therefore, a conventional spike phenomenon occurred at the moment switching the rotation direction of the fan is effectively prevented in the present invention. Besides, owing to the circuit design that the soft start activation unit possesses the first signal transmission loop and the second signal transmission loop simultaneously, when the rotation direction of the fan switches from the first direction to the second direction, the soft start activation unit activates the soft start control unit via the first signal transmission loop; when the rotation direction of the fan switches from the second direction to the first direction, the soft start activation unit activates the soft start control unit via the second signal transmission loop. Accordingly, the fan enables to start rotation in the soft start mode no matter which rotation direction the fan is changed.

DETAILED DESCRIPTION OF THE INVENTION

Figure 1:
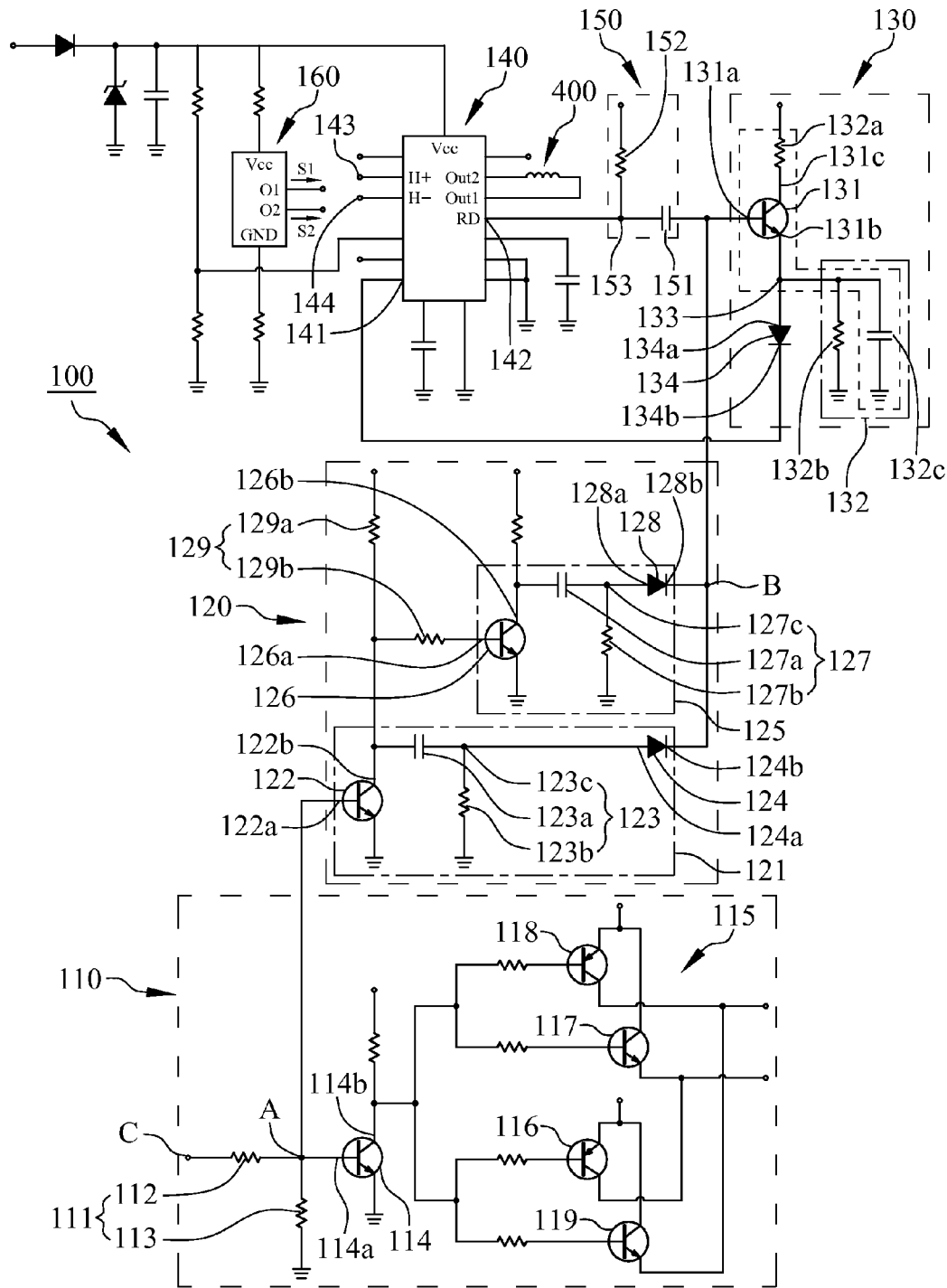
FIG. 1 is a circuit diagram illustrating a soft start circuit for a forward/reverse rotation fan in accordance with a first embodiment of the present invention.

With reference to FIG. 1, a soft start circuit 100 for a forward/reverse rotation fan in accordance with a first embodiment of the present invention includes a forward/reverse switch unit 110, a soft start activation unit 120, a soft start control unit 130, a driver IC 140 and a Hall IC 160, wherein the forward/reverse switch unit 110 enables to receive a high level signal or a low level signal, and the soft start activation unit 120 comprises a first signal transmission loop 121 and a second signal transmission loop 125. When the soft start activation unit 120 receives the high level signal, the first signal transmission loop 121 outputs a first instantaneous signal, oppositely, when the soft start activation unit 120 receives the low level signal, the second signal transmission loop 125 outputs a second instantaneous signal. In this embodiment, the first instantaneous signal and the second instantaneous signal are high voltage level signals. Additionally, when the soft start control unit 130 receives the first instantaneous signal outputted from the first signal transmission loop 121 or the second instantaneous signal outputted from the second signal transmission loop 125, the soft start control unit 130 outputs a control signal to a speed control terminal 141 of the driver IC 140. When the forward/reverse switch unit 110 receives the high level signal, the Hall IC 160 drives the driver IC 140 via the forward/reverse switch unit 110 to make the fan rotate in a second direction, oppositely, when the forward/reverse switch unit 110 receives the low level signal, the Hall IC 160 drives the driver IC 140 via the forward/reverse switch unit 110 to make the fan rotate in a first direction. The soft start control unit 130 of the soft start circuit 100 is activated by the first instantaneous signal transmitted by the first signal transmission loop 121 or the second instantaneous signal transmitted by the second signal transmission loop 125 to make the control signal varied from low level to high level. When the rotation direction of the fan is switched from the first direction to the second direction or switched from the second direction to the first direction, the fan enables to start rotation in a soft start mode owing to high level of the control signal transmitted from the soft start control unit 130 to the speed control terminal 141 during initial rotation of the fan. After initial rotation, the voltage level of the speed control terminal 141 decreases gradually from high level to low level so as to make the rotation speed of the fan increase gradually. Therefore, a conventional spike phenomenon occurred at switching the rotation direction of the fan is effectively prevented in the present invention.

Please refers to FIG. 1, the soft start circuit 100 further includes a signal receiving terminal C, the forward/reverse switch unit 110 comprises a control terminal A, the signal receiving terminal C enables to receive the high level signal or the low level signal, wherein the high level signal or the low level signal is transmitted from the signal receiving terminal C to the forward/reverse switch unit 110 and the soft start activation unit 120 via the control terminal A. The soft start activation unit 120 further comprises a signal transmission terminal B, the first signal transmission loop 121 comprises a first transistor 122 and a first RC circuit 123 electrically connected to the first transistor 122, and the second signal transmission loop 125 comprises a second transistor 126 and a second RC circuit 127 electrically connected to the second transistor 126. The control terminal A of the forward/reverse switch unit 110 electrically connects to the first transistor 122 of the first signal transmission loop 121, the signal transmission terminal B electrically connects to the first RC circuit 123 and the second RC circuit 127, wherein the first instantaneous signal and the second instantaneous signal both possess the same transmission path transmitted from the signal transmission terminal B to the soft start control unit 130. The soft start control unit 130 comprises a third transistor 131, a third RC circuit 132 and a third node 133, the signal transmission terminal B of the soft start activation unit 120 electrically connects to the third transistor 131, particularly, the third transistor 131 electrically connects to the third RC circuit 132 and the speed control terminal 141 of the driver IC 140 via the third node 133. In this embodiment, the soft start circuit 100 further includes a lock restoration circuit 150 electrically connected to the third transistor 131 of the soft start control unit 130 and a rotation detection terminal 142 of the driver IC 140.

With reference to FIG. 1, the first transistor 122 of the first signal transmission loop 121 comprises a first base electrode 122a and a first collecting electrode 122b, the first RC circuit 123 comprises a first capacitor 123a, a first resistor 123b and a first node 123c, and the first capacitor 123a and the first resistor 123b jointly connect to the first node 123c. The second transistor 126 of the second signal transmission loop 125 comprises a second base terminal 126a and a second collecting terminal 126b, the second RC circuit 127 comprises a second capacitor 127a, a second resistor 127b and a second node 127c, and the second capacitor 127a and the second resistor 127b jointly connect to the second node 127c. The first base electrode 122a of the first transistor 122 electrically connects to the control terminal A of the forward/reverse switch unit 110, the first collecting electrode 122b electrically connects to one end of the first capacitor 123a of the first RC circuit 123 and the second base electrode 126a of the second transistor 126, the second collecting electrode 126b of the second transistor 126 electrically connects to one end of the second capacitor 127a of the second RC circuit 127, and the signal transmission terminal B of the soft start activation unit 120 electrically connects to the first node 123c of the first RC circuit 123 and the second node 127c of the second RC circuit 127. Preferably, in this embodiment, the first signal transmission loop 121 further comprises a first diode 124, the first node 123c of the first RC circuit 123 electrically connects to the signal transmission terminal B via the first diode 124, the second signal transmission loop 125 further comprises a second diode 128, the second node 127c of the second RC circuit 127 electrically connects to the signal transmission terminal B via the second diode 128. Besides, an anode 124a of the first diode 124 electrically connects to the first node 123c of the first RC circuit 123, an anode 128a of the second diode 128 electrically connects to the second node 127c of the second RC circuit 127, a cathode 124b of the first diode 124 and a cathode 128b of the second diode 128 electrically connects to the signal transmission terminal B.

Figure 2:
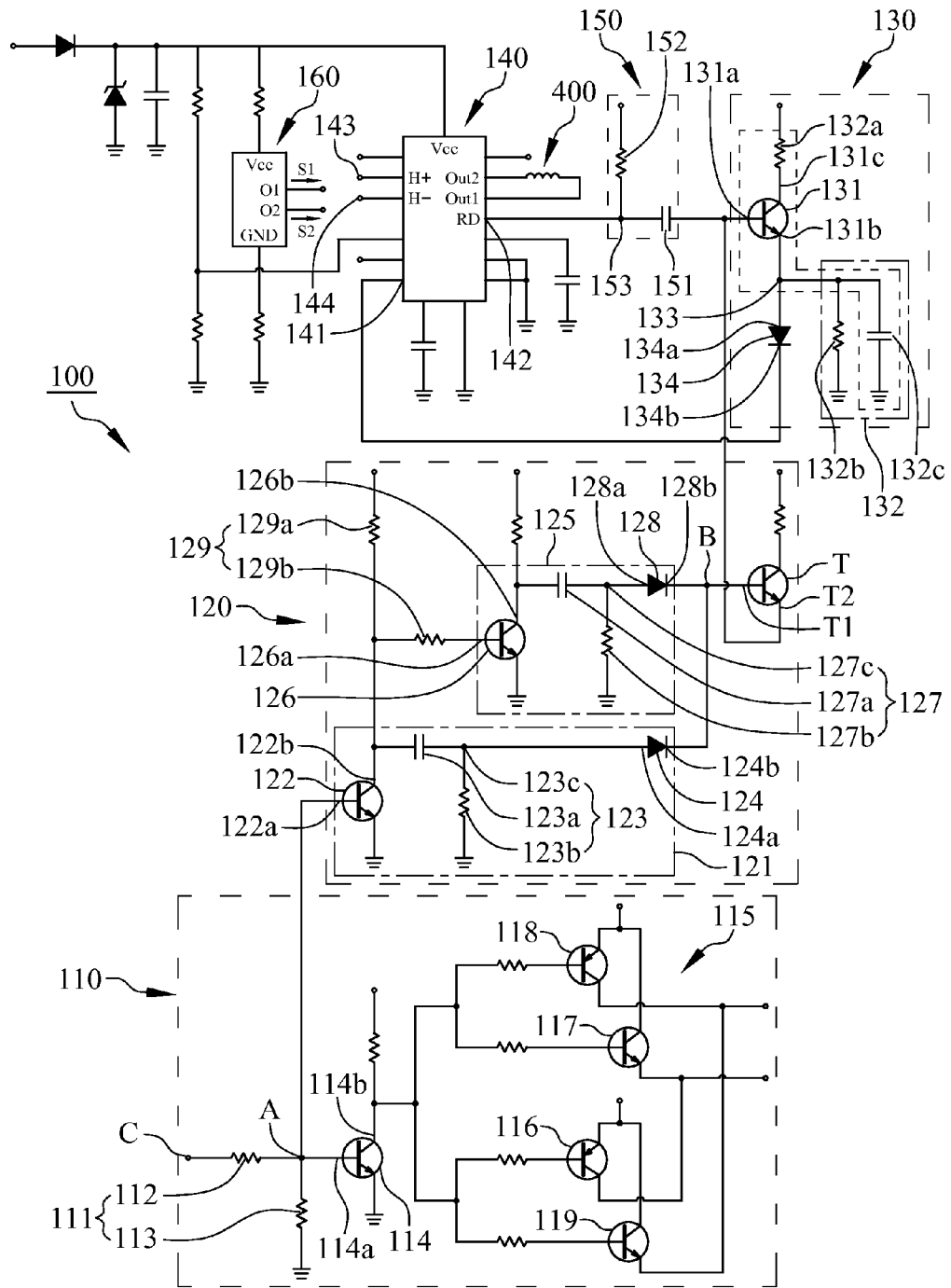
FIG. 2 is a circuit diagram illustrating a soft start circuit for a forward/reverse rotation fan in accordance with a second embodiment of the present invention.
Figure 3:
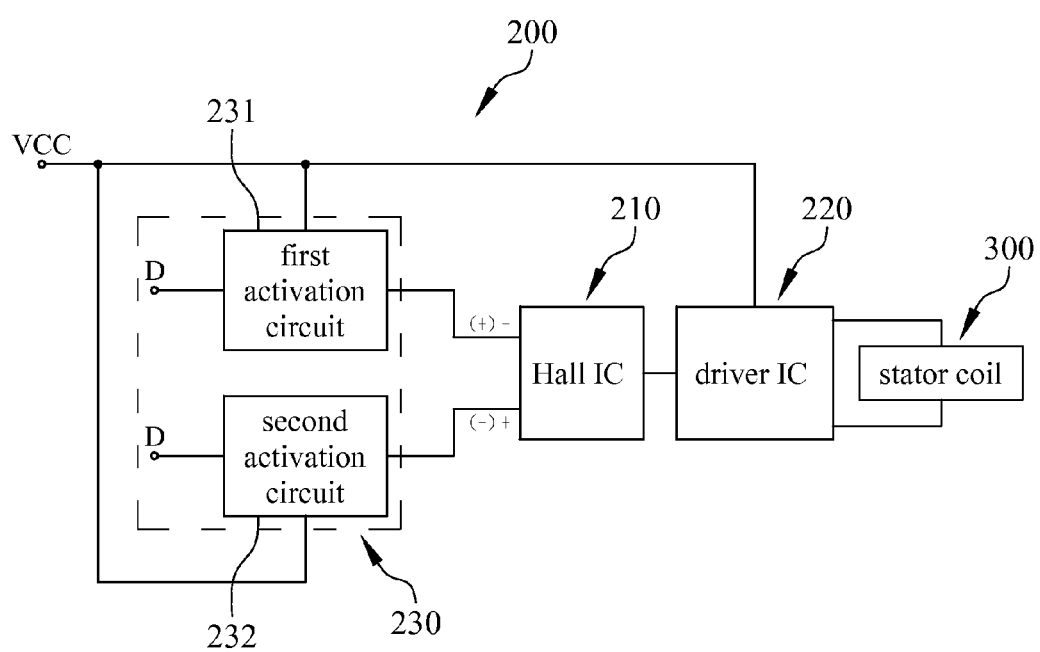
FIG. 3 is a conventional start circuit for a forward/reverse rotating fan.

A second embodiment of the present invention is illustrated in FIG. 2. The primary difference between the second embodiment and the first embodiment is that the soft start activation unit 120 further comprises a fourth transistor T, and the signal transmission terminal B electrically connects to the third transistor 131 of the soft start control unit 130 via the fourth transistor T. The fourth transistor T comprises a fourth base electrode T1 and a fourth emitting electrode T2, the fourth base electrode T1 electrically connects to the signal transmission terminal B, and the fourth emitting electrode T2 electrically connects to the third transistor 131.

Referring to FIG. 1, the third transistor 131 of the soft start control unit 130 comprises a third base electrode 131a, a third emitting electrode 131b and a third collecting electrode 131c, the third RC circuit 132 comprises a third resistor 132a, a fourth resistor 132b and a third capacitor 132c, wherein the third emitting electrode 131b electrically connects to one end of the third capacitor 132c, one end of the fourth resistor 132b and the speed control terminal 141 of the driver IC 140 via the third node 133, the third capacitor 132c and the fourth resistor 132b are mutually connected in parallel, and the third collecting electrode 131c electrically connects to one end of the third resistor 132a. In this embodiment, a charge circuit is composed of the third resistor 132a and the third capacitor 132c, and a discharge circuit is composed of the third capacitor 132c and the fourth resistor 132b. Preferably, the soft start control unit 130 further comprises a third diode 134, the third node 133 electrically connects to the speed control terminal 141 via the third diode 134, an anode 134a of the third diode 134 electrically connects to the third node 133, a cathode 134b of the third diode 134 electrically connects to the speed control terminal 141 of the driver IC 140. In addition, the lock restoration circuit 150 comprises a fourth capacitor 151, a fifth resistor 152 and a fourth node 153, the third base electrode 131a of the third transistor 131 electrically connects to one end of the fourth capacitor 151, and the fourth node 153 electrically connects to one end of the fifth resistor 152, another end of the fourth capacitor 151 and the rotation detection terminal 142 of the driver IC 140. When the fan is locked to stop rotation and then being repaired, the rotation detection terminal 142 outputs a voltage signal to the lock restoration circuit 150, and the lock restoration circuit 150 transmits an instantaneous signal to the soft start control unit 130 to make the third transistor 131 in conduction. Thereafter, the third RC circuit 132 transmits a modulating signal to the speed control terminal 141 of the driver IC 140 owing the actions of energy storage and energy discharge. When the fan starts rotation, the fan enables to rotate in the soft start mode for the reason that the modulating signal received by the speed control terminal 141 is high voltage level.

With reference to FIG. 1, the soft start activation unit 120 further comprises a first voltage divider 129 having a sixth resistor 129a and a seventh resistor 129b electrically connected to the sixth resistor 129a, the first collecting electrode 122b of the first transistor 122 of the first signal transmission loop 121 electrically connects to one end of the sixth resistor 129a and one end of the seventh resistor 129b, and the second base electrode 126a of the second transistor 126 electrically connects to another end of the seventh resistor 129b. The forward/reverse switch unit 110 further comprises a second voltage divider 111 electrically connected to the signal receiving terminal C, a fifth transistor 114 electrically connected to the second voltage divider 111 and a switching circuit 115 electrically connected to the fifth transistor 114. The second voltage divider 111 comprises an eighth resistor 112 and a ninth resistor 113, the fifth transistor 114 comprises a fifth base electrode 114a and a fifth collecting electrode 114b, wherein the control terminal A electrically connects to one end of the eighth resistor 112, one end of the ninth resistor 113 and the fifth base electrode 114a, the signal receiving terminal C electrically connects to another end of the eighth resistor 112, and the fifth collecting electrode 114b electrically connects to the switching circuit 115.

The action of the soft start circuit 100 is described as below. The fan enables to rotate along the first direction or the second direction. Switching the rotation direction of the fan is controllable by the forward/reverse switch unit 110. When the signal receiving terminal C of the forward/reverse switch unit 110 situates at low voltage level or floating state, the control terminal A receives the low level signal. Meantime, the fifth transistor 114 is in off state, a second switch 117 of the switching circuit 115 is conductive to make the first control signal S1 that is outputted from the Hall IC 160 transmit from the second switch 117 to an H(−) receiving terminal 144 of the driver IC 140, and a fourth switch 119 of the switching circuit 115 is conductive to make the second control signal S2 that is outputted from the Hall IC 160 transmit from the fourth switch 119 to an H(+) receiving terminal 143 of the driver IC 140. Therefore, the driver IC 140 outputs a driving signal to a motor coil 400 to make the fan rotate in the first direction. When the rotation direction of the fan is determined to switch from the first direction to the second direction, the signal receiving terminal C of the forward/reverse switch unit 110 situates at high voltage level. Meantime, the control terminal A receives the high level signal and simultaneously drives the fifth transistor 114 of the forward/reverse switch unit 110 and the first transistor 122 of the first signal transmission loop 121 into conduction, then, a third switch 118 of the switching circuit 115 is conductive to make the first control signal S1 that is outputted from the Hall IC 160 transmit from the third switch 118 to the H(+) receiving terminal 143 of the driving IC 140, and a first switch 116 of the switching circuit 115 is conductive to make the second control signal S2 that is outputted from the Hall IC 160 transmit from the first switch 116 to the H(−) receiving terminal 144 of the driver IC 140. Owing to change of conductive direction between the first control signal S1 and the second control signal S2, the polarity for the driver IC 140 to drive the motor coil 400 changes as well. Therefore, the rotation direction of the fan is switched from the first direction to the second direction. On the other part, the conductive state of the first transistor 122 makes the first RC circuit 123 of the first signal transmission loop 121 generate the first instantaneous signal to transmit toward the signal transmission terminal B for activating the third transistor 131 into conduction. In one condition, the rotation direction of the fan is about to switch from the first direction to the second direction, when the fan stops rotation in the first direction according to rotational inertia of the fan, owing to energy storage action of the charge circuit composed of the third RC circuit 132, the control signal received by the speed control terminal 141 is high voltage level during initial rotation of the fan. Therefore, the fan enables to rotate in the second direction in the soft start mode. Later, the discharge circuit being composed of the third RC circuit 132 releases the energy to make the voltage level of the speed control terminal 141 decrease gradually resulting in gradual increase of fan speed. Oppositely, when the rotation direction of the fan is determined to switch from the second direction to the first direction, the state of the signal receiving terminal C becomes low level or floating state once again. The first transistor 122 of the first signal transmission loop 121 is in off state, the second transistor 126 of the second signal transmission loop 125 is in conduction state, the second RC circuit 127 enables to generate the second instantaneous signal to transmit toward the soft start control unit 130 via the signal transmission terminal B to activate the third transistor 131 into conduction state. In another condition, the rotation direction of the fan is about to switch from the second direction to the first direction, when the fan stops rotation in the second direction according to rotational inertia of the fan, owing to energy storage action of the third RC circuit 132, the control signal received by the speed control terminal 141 is high voltage level during initial rotation of the fan. Therefore, the fan enables to rotate in the first direction in the soft start mode.

The present invention utilizes the soft start activation unit 120 to activate the soft start control unit 130 via the first instantaneous signal transmitted from the first signal transmission loop 121 or the second instantaneous signal transmitted from the second signal transmission loop 125. When the rotation direction of the fan changes, owing to energy storage of the third RC circuit 132 of the soft start control unit 130, the control signal transmitted from the soft start control unit 130 to the speed control terminal 141 is high level during initial rotation of the fan. Therefore, the fan enables to start rotation in the soft start mode. Afterward, the third RC circuit 132 performs another energy discharge action, which results in decrease of voltage level of the speed control terminal 141 as well as increase of rotation speed of the fan so that the conventional spike occurred at switching the rotation direction of the fan can be effectively prevented in the present invention. Besides, owing to the circuit design that the soft start activation unit 120 both possesses the first signal transmission loop 121 and the second signal transmission loop 125, when the rotation direction of the fan switches from the first direction to the second direction, the soft start activation unit 120 activates the soft start control unit 130 via the first signal transmission loop 121; when the rotation direction of the fan switches from the second direction to the first direction, the soft start activation unit 120 activates the soft start control unit 130 via the second signal transmission loop 125. Accordingly, the fan enables to start rotation in the soft start mode no matter which rotation direction the fan is changed.

While this invention has been particularly illustrated and described in detail with respect to the preferred embodiments thereof, it will be clearly understood by those skilled in the art that it is not limited to the specific features and describes and various modifications and changes in form and details may be made without departing from the spirit and scope of this invention.

What is claimed is:

1. A soft start circuit for a forward/reverse rotation fan includes:
   a forward/reverse switch unit enables to receive a high level signal or a low level signal;
   a soft start activation unit having a first signal transmission loop and a second signal transmission loop, when the soft start activation unit receives the high level signal, the first signal transmission loop outputs a first instantaneous signal; when the soft start activation unit receives the low level signal, the second signal transmission loop outputs a second instantaneous signal;

a soft start control unit, when the soft start control unit receives the first instantaneous signal or the second instantaneous signal, the soft start control unit outputs a control signal;

a Hall IC; and a driver IC having a speed control terminal, when the forward/reverse switch unit receives the high level signal, the Hall IC drives the driver IC via the forward/reverse switch unit to make the fan rotate in a second direction; when the forward/reverse switch unit receives the low level signal, the Hall IC drives the driver IC via the forward/reverse switch unit to make the fan rotate in a first direction, wherein the first instantaneous signal or the second instantaneous signal of the soft start circuit activates the soft start control unit to make the control signal varied from low level to high level, when the rotation direction of the fan is switched from the first direction to the second direction or switched from the second direction to the first direction, the fan enables to start rotation in a soft start mode owing to high level of the control signal transmitted from the soft start control unit to the speed control terminal during initial rotation of the fan.

2. The soft start circuit for a forward/reverse rotation fan in accordance with claim 1, wherein the forward/reverse switch unit comprises a control terminal, the soft start activation unit comprises a signal transmission terminal, the first signal transmission loop comprises a first transistor and a first RC circuit electrically connected to the first transistor, the second signal transmission loop comprises a second transistor and a second RC circuit electrically connected to the second transistor, the control terminal electrically connects to the first transistor, and the signal transmission terminal electrically connects to the first RC circuit and the second RC circuit.

3. The soft start circuit for a forward/reverse rotation fan in accordance with claim 2, wherein the first transistor of the first signal transmission loop comprises a first base electrode and a first collecting electrode, the second transistor of the second signal transmission loop comprises a second base electrode and a second collecting electrode, the first base electrode electrically connects to the control terminal, the first collecting electrode electrically connects to the first RC circuit and the second base electrode of the second transistor, and the second collecting electrode electrically connects to the second RC circuit.

4. The soft start circuit for a forward/reverse rotation fan in accordance with claim 3, wherein the first RC circuit comprises a first capacitor, a first resistor and a first node, the first node electrically connects to one end of the first capacitor and one end of the first resistor, the second RC circuit comprises a second capacitor, a second resistor and a second node, the second node electrically connects to one end of the second capacitor and one end of the second resistor, the first collecting electrode electrically connects to another end of the first capacitor, the second collecting electrode electrically connects to another end of the second capacitor, and the signal transmission terminal electrically connects to the first node of the first RC circuit and the second node of the second RC circuit.

5. The soft start circuit for a forward/reverse rotation fan in accordance with claim 2, wherein the soft start control unit comprises a third transistor, a third RC circuit and a third node, the signal transmission terminal of the soft start activation unit electrically connects to the third transistor, the third transistor electrically connects to the third RC circuit and the speed control terminal of the driver IC via the third node, and the speed control terminal enables to receive the control signal outputted from the third node.

6. The soft start circuit for a forward/reverse rotation fan in accordance with claim 5, wherein the third transistor of the soft start control unit comprises a third base electrode, a third collecting electrode and a third emitting electrode, the third RC circuit comprises a third resistor, a third capacitor and a fourth resistor, the third base electrode electrically connects to the signal transmission terminal, the third collecting electrode electrically connects to one end of the third resistor, the third emitting electrode electrically connects to one end of the third capacitor, one end of the fourth resistor and the speed control terminal of the driver IC via the third node.

7. The soft start circuit for a forward/reverse rotation fan in accordance with claim 6, wherein the soft start control unit further comprises a third diode, the third node electrically connects to the speed control terminal via the third diode, an anode of the third diode electrically connects to the third node, a cathode of the third diode electrically connects to the speed control terminal of the driver IC.

8. The soft start circuit for a forward/reverse rotation fan in accordance with claim 6 further includes a lock restoration circuit having a fourth capacitor, a fifth resistor and a fourth node, the third base electrode of the third transistor electrically connects to one end of the fourth capacitor, the fourth node electrically connects to one end of the fifth resistor, another end of the fourth capacitor and a rotation detection terminal of the driver IC.

9. The soft start circuit for a forward/reverse rotation fan in accordance with claim 3, wherein the soft start activation unit further comprises a first voltage divider having a sixth resistor and a seventh resistor electrically connected to the sixth resistor, the first collecting electrode of the first transistor electrically connects to the second base electrode of the second transistor via the seventh resistor.

10. The soft start circuit for a forward/reverse rotation fan in accordance with claim 4, wherein the first signal transmission loop further comprises a first diode, the first node of the first RC circuit electrically connects to the signal transmission terminal via the first diode, the second signal transmission loop further comprises a second diode, the second node of the second RC circuit electrically connects to the signal transmission terminal via the second diode, an anode of the first diode electrically connects to the first node of the first RC circuit, an anode of the second diode electrically connects to the second node of the second RC circuit, a cathode of the first diode and a cathode of the second diode electrically connects to the signal transmission terminal.

11. The soft start circuit for a forward/reverse rotation fan in accordance with claim 1, wherein the soft start activation unit further comprises a fourth transistor, the signal transmission terminal electrically connects to the third transistor via the fourth transistor.

12. The soft start circuit for a forward/reverse rotation fan in accordance with claim 2 further includes a signal receiving terminal, wherein the forward/reverse switch unit further comprises a second voltage divider electrically connected to the signal receiving terminal, a fifth transistor electrically connected to the second divided circuit and a switching circuit electrically connected to the fifth transistor.

13. The soft start circuit for a forward/reverse rotation fan in accordance with claim 12, wherein the second voltage divider comprises an eighth resistor and a ninth resistor, the fifth transistor comprises a fifth base electrode and a fifth collecting electrode, the control terminal electrically connects to one end of the eighth resistor, one end of the ninth resistor and the fifth base electrode of the fifth transistor, the signal receiving terminal electrically connects to another end of the eighth resistor, and the fifth collecting electrode electrically connects to the switching circuit.

14. The soft start circuit for a forward/reverse rotation fan in accordance with claim 1, wherein the first instantaneous signal and the second instantaneous signal are high voltage level signals.

\* \* \* \* \*